US007023844B2

(12) United States Patent
Wolrich et al.

(10) Patent No.: US 7,023,844 B2

(45) Date of Patent: Apr. 4, 2006

(54) SCALABLE SWITCHING FABRIC

(75) Inventors: Gilbert Wolrich, Framingham, MA (US); Matthew J. Adiletta, Worcester, MA (US); John Cyr, Boxborough, MA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 10/423,101

(22) Filed: Apr. 25, 2003

(65) Prior Publication Data

US 2003/0193936 A1 Oct. 16, 2003

Related U.S. Application Data

(63) Continuation of application No. 09/387,047, filed on Aug. 31, 1999, now Pat. No. 6,687,246.

(51) Int. Cl.
*H04L 12/50* (2006.01)
*H04L 12/56* (2006.01)
*H04Q 11/08* (2006.01)

(52) U.S. Cl. ....................... 370/388; 370/414; 370/364

(58) Field of Classification Search ........ 370/413–414, 370/360–388

See application file for complete search history.

(56) References Cited

U.S. PATENT DOCUMENTS 3,373,408 A 3/1968 Ling .......................... 712/228
5,321,691 A 6/1994 Pashan .................... 370/395.7
6,002,861 A * 12/1999 Butts et al. .................... 703/16
6,055,235 A * 4/2000 Blanc et al. ................ 370/389
6,061,345 A * 5/2000 Hahn et al. ................. 370/351
6,067,298 A * 5/2000 Shinohara .............. 370/395.71
6,201,792 B1 * 3/2001 Lahat ......................... 370/236
6,687,246 B1 * 2/2004 Wolrich et al. ............. 370/388
6,868,065 B1 * 3/2005 Kloth et al. ................ 370/236

FOREIGN PATENT DOCUMENTS

EP 0 918 419 A 5/1999

OTHER PUBLICATIONS

Newton, Newton's Telecom Dictionary, Oct. 1998, Telecom Books, p. 113-114.*

"A New Self-Routing Switch Driven with Input-to-Output Address Difference", Proceedings of the Global Telecommunications Conference and Exhibition (Globecom), U.S., New York, IEEE, Nov. 28, 1988, pps. 1607-1611.

"Evaluation of a Multistage Switching Network with Broadcast Traffic", Electronics Industries Forum, US, New York, IEEE May 6, 1997, pps. 143-147.

* cited by examiner

*Primary Examiner*—Chi Pham
*Assistant Examiner*—Ronald Abelson
(74) *Attorney, Agent, or Firm*—Fish & Richardson P.C.

(57) ABSTRACT

A switch fabric includes a first plurality of data switches each having a plurality of input ports and a plurality of output ports the plurality of switches capable of switching any of its input ports to any of its output ports with the plurality of data switches having inputs coupled to a plurality of input buses so that a first byte of a first one of the input buses is coupled to a first one of the plurality of switches, and a succeeding byte of the first input bus is coupled to a succeeding one of the plurality of switches.

4 Claims, 7 Drawing Sheets

BACKPLANE, 30
PCI
30a
30b
30c 30d
30e
30f
30g 30h
30i
A B C D E F G H
BLADE 3
BLADE 2
BLADE 1
BLADE 0
RSC, 12
PROCESSOR
SDRAM
SRAM
21440 MAC
PHY
PCI, BUS[31:0]
31, FBUS
14
13
15
16
24
32
8
64

SCALABLE SWITCHING FABRIC

RELATED APPLICATIONS

This application is a continuation of and claims priority to U.S. application Ser. No. 09/387,047, filed Aug. 31, 1999, entitled "SCALABLE SWITCHING FABRIC."

Crossbars are one type of switching fabric used to switch data between pluralities of devices. They can be thought of as a switch that has a plurality of vertical paths interconnected by switching elements to a plurality of horizontal paths in a manner that the switch elements can interconnect any one of the vertical paths to any one of the horizontal paths. Generally such crossbars are implemented with custom application specific integrated circuits (ASIC's).

SUMMARY

According to an aspect of the present invention, a switch fabric includes a network switch having a plurality of inputs and outputs and a distributed switching arrangement to provide a non-blocking switching fabric capability over a series of byte sliced buses.

According to an additional aspect of the present invention, a switch for coupling network devices to a network processor, includes a plurality of virtual queues and input segment logic coupled to at least one bus, said input segment logic to determine to which virtual queue incoming data should be sent to and output segment logic to select which new virtual queue should be connected to an output port.

According to an additional aspect of the present invention, a switch fabric includes a first plurality of data switches each having a plurality of input ports and a plurality of output ports the plurality of switches capable of switching any of its input ports to any of its output ports with the plurality of data switches having inputs coupled to a plurality of input buses so that a first byte of a first one of the input buses is coupled to a first one of the plurality of switches, and a succeeding byte of the first input bus is coupled to a succeeding one of the plurality of switches.

One or more of the following advantages may be provided by one or more aspects of the invention.

A high performance, scalable switching fabric is provided for scaling a rotary switch for a multitude of ports. The rotary switch uses virtual queuing providing the rotary switch controller (RSC) full crossbar capability, such that any of its input queues can couple to any of its output queues without blocking. The RSC permits dynamic configuration of additional ports. The RSC is a modular concept allowing a switch to grow from e.g., 32 ports to 64 ports to 128 ports using a passive backplane.

DESCRIPTION

Figure 1:
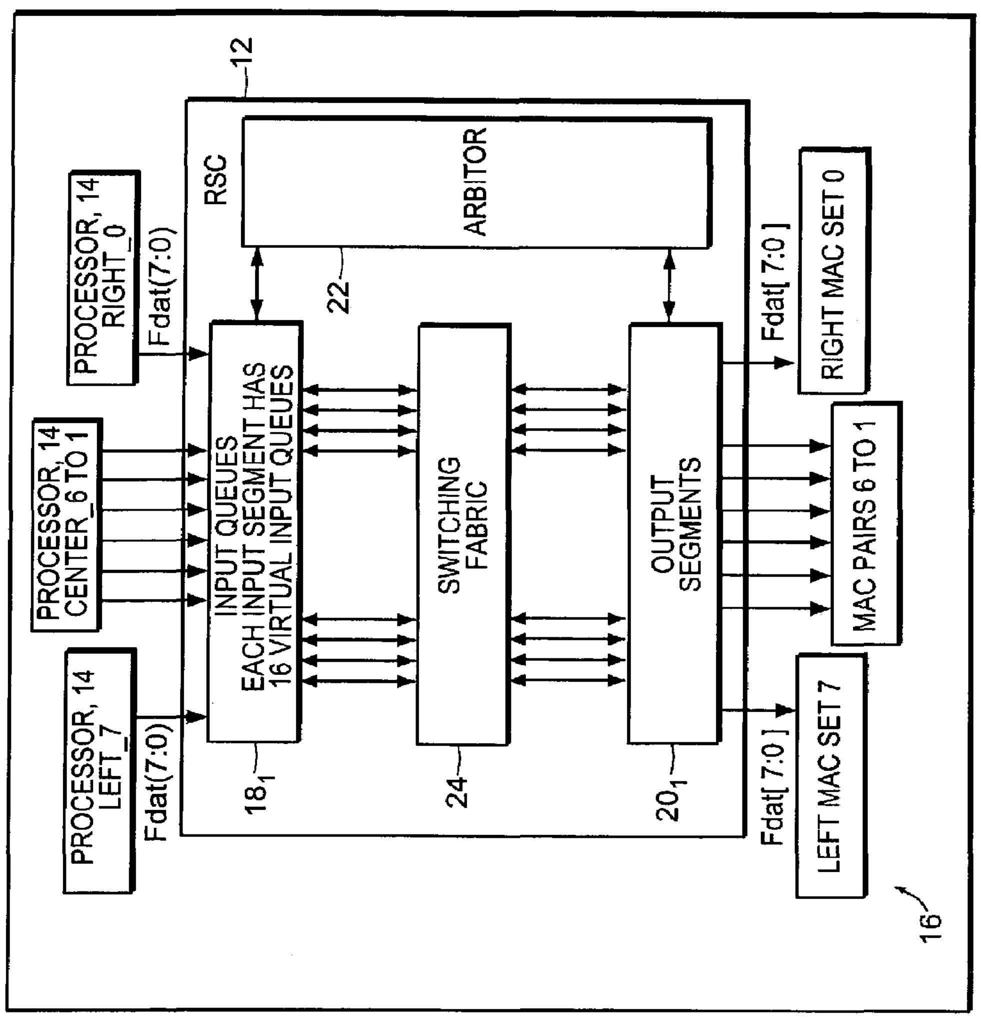
FIG. 1 is a block diagram of a network system including a rotary switch.

Referring to FIG. 1, a networked system 10 includes a rotary switch 12 transfering data from input ports to output ports in a non-blocking manner. For instance, the switch can be used for sending packet data at plurality of network processors 14 to network devices 16 coupled to separate 32 bit FIFO busses. The rotary switch 12 includes a data path that is sliced or partitioned on an 8 bit (i.e. byte) basis to allow system 10 to be expanded from e.g., a 2×2 FIFO bus system to an 8×8 FIFO bus system and so forth as described below. The rotary switch 12 includes a plurality of 8-bit wide Virtual Input Queues ("VIQ") 18 that are distributed into input segments with each of 8 byte wide input segments coupled to 16 of the VIQ's 18. The rotary switch device 12 also includes a plurality of Output Segments 20.

The rotary switch 12 also includes a switching fabric network 24 which in combination with the Virtual Input Queues and output segment logic 20 can move byte wide data from any of the plurality of Input Virtual Queues 18 to an output FBUS byte without restricting the access of any other input segment to any of Input Virtual Queues 18. Data switching is controlled by a arbiter 22.

The internal fabric 24 of the RSC 12 provides full input to output connectivity that is, any and all of the inputs can connect to any and all of the outputs. In an exemplary rotary switch 12, there are 128 8-bit wide Virtual Input Queues ("VIQ"), distributed over 8 segments, e.g., 16 VIQ's per segment and 8 output segments, thus providing a device 12 having 128 input ports to any of the 128 output ports. The fabric is an independently queued structure that does not require symmetric switching. The switching is a distributed function between a loose arrangement among processors 14 and the RSC fabric 24. The RSC arbiter 22 provides a fair round robin service for received packets. The processors 14 can provide packets either through a simple round robin or weighted fair queuing to the RSC 12. The output port switching is based on a PULL arbitration scheme.

Figure 2:
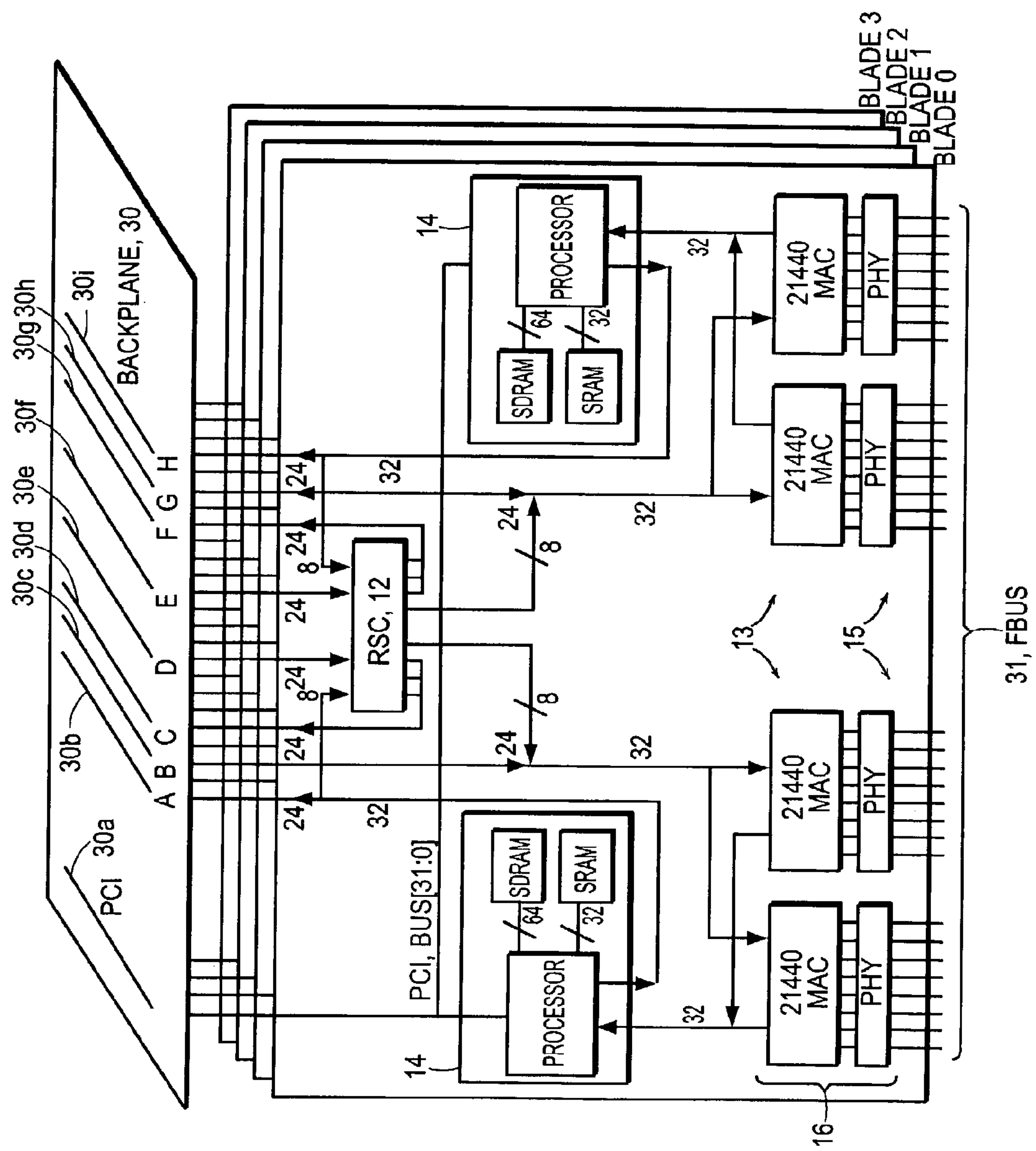
FIG. 2 is block diagram showing an implementation of the rotary switch.

Referring to FIG. 2, an implementation of the system 10 of FIG. 1, is shown. A rotary switch device 12 is shown coupled to a pair of network processors 14. The network processors are preferably parallel-based multithreaded processors. One example of such a processor is described in U.S. Patent Application entitled "PARALLEL PROCESSOR ARCHITECTURE", filed on Aug. 31, 1999, application Ser. No. 09/387,111 and assigned to the assignee of the present invention and incorporated herein by reference. Each of the processors 14 communicate with network devices 16, e.g., here Media Access Controllers (MAC'S) 13 that are coupled to the physical layer 15 of a network.

The system 10 also includes a passive backplane 30. The passive backplane 30 employs tri-state steering logic to enable dynamic reconfiguration of the system 10 based on the number of ports supported. This system 10 is a byte slice arrangement. As a byte sliced arrangement, when new ports are added, all ports stop transmitting to RSC devices 12. Depending on buffering and steering initialization time, input ports may or may not have to be paused. The passive backplane includes nine (9) main busses 30_a_–30_b_. The first bus 30_a_ is a computer bus e.g., a Personal Computer Interconnect (PCI) bus. While this is bridged bus, and therefore strictly speaking the backplane is not passive, the bridge and microprocessor unit that is commonly associated with busses such as the PCI bus can be provided as a daughter card to maintain a passive backplane 30. The other 8 busses on the backplane are used to interconnect the RSC blades Blade_0–Blade_3. A RSC blade is an arrangement of RSC devices 12, network processors 14 and network devices 16.

Since the FBUS data (32 bit Unidirectional busses) is sectioned into up to four 8 bit segments. The segments can be sized based on the number of equivalent ports supported by the system 10. If a single blade is used i.e., a 32 port system, the backplane steering logic connects Bus 30*b* to Bus 30*e* and Bus 30*i* to Bus 30*f* to provide input data, i.e., two 24 bit FBUS data busses to the RSC 12. These two busses along with immediate feedback of 8 bits each from Bus 30*b* and Bus 30*i* form two 32 bit input busses to the RSC 12. Bus 30*d* is steered to Bus 30*c* for transmit to the MAC device 16. The 24 data bits of FBUS buses along with the 8 bits from the RSC 12 form 32 bits to the MAC. Similarly, Bus 30*g* is steered to Bus 30*h* and merged with 8 bits of immediate feedback data from the RSC 12 to form 32 bits to the MACs 16.

Each blade e.g., Blade_0 to Blade_3 is similar in construction and are scaled together via the passive backplane 32. Thus, if system 10 has 64 ports supported, the steering logic (not shown) selects the appropriate bytes from each of the busses and connects them to their respective destination busses in 16 bit sections. If 128 ports are instantiated, then the section size is 8 bits. It should be noted that a 64 port system can be configured into a 96 port system where the section size is 8 bits, and the three RSC blades are used, with only 6 input segments (instead of the possible 8). In this type of configuration, a fourth RSC is required to complete the 32 bit byte-slice. Therefore, 96 port systems require the use of a simple add-in board which is populated with only an RSC using bits (31:8) on both input sections.

Figure 3:
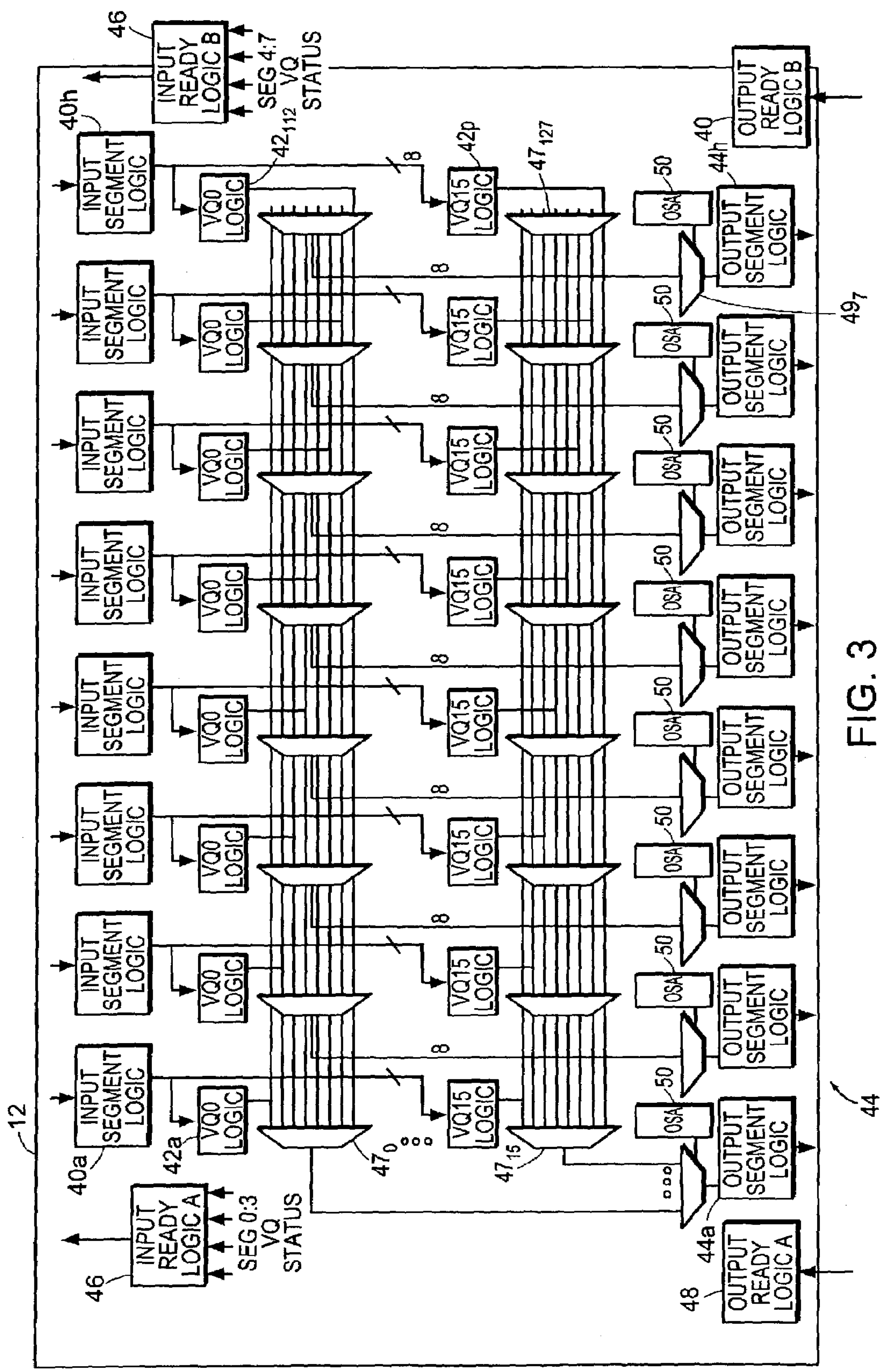
FIG. 3 is a block diagram of the rotary switch.

Referring to FIG. 3, the RSC 12 includes input segment logic devices (ISL) 40*a*–40*h* that handles incoming FBUS data and distributes the incoming data to an appropriate virtual input queue in virtual queue logic (VQL) devices 42*a*–42*p*. The RSC 12 also includes output segment logic devices (OSL) 44*a*–44*h*. The OSL devices 44 pull data from the VQL logic devices 42 and deliver the data to the output side of the FBUS for distribution to appropriate MAC devices 13. The input virtual queues $\mathbf{42}_0$ to $\mathbf{42}_{127}$ are coupled to the output segment logic 44 via a series of multiplexers $\mathbf{47}_0$ to $\mathbf{47}_{127}$. Each of the multiplexers $\mathbf{42}_0$ to $\mathbf{42}_{127}$ is coupled to each of the virtual input queues 42 in its row (e.g., VIQ $\mathbf{42}_0$–$\mathbf{42}_{112}$ for multiplexer $\mathbf{42}_0$). There are sixteen of said multiplexers in each column. The output of the multiplexers $\mathbf{47}_0$ to $\mathbf{47}_{127}$ for each of the columns (e.g., multiplexer $\mathbf{47}_0$–$\mathbf{47}_{15}$ for column 0) feed corresponding output multiplexers $\mathbf{49}_0$ to $\mathbf{49}_7$ which are coupled to the output segment logic 44*a*–44*h*.

Figure 6:
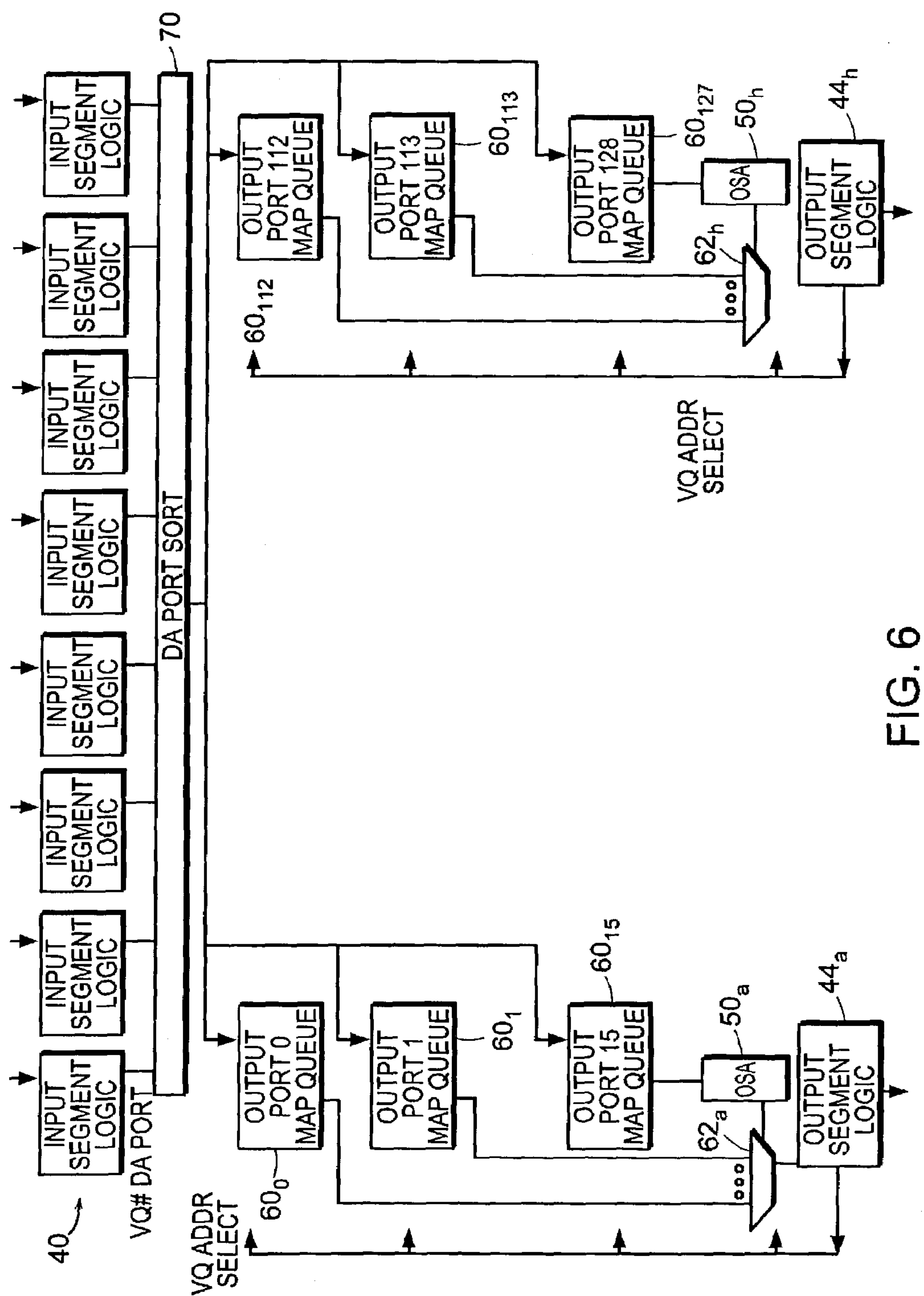
FIG. 6 is a block diagram showing structures used in arbitration in the rotary switch.

The RSC 12 also includes Input Ready logic 46 that samples the virtual input queues in the virtual queue logic (VQL) devices 42*a*–42*p* to report back the status of the virtual input queues to mapped input segments, so that the devices 14 (FIG. 1) that supply data can track buffer fullness. The RSC 12 also includes output ready logic 48. The Output Ready Logic (ORL) 48 is analogous to the Input ready logic. However, the ORL 48 samples the network devices 16 e.g., MAC transmit ready bits to determine if the network devices 16 are ready to accept more transmit data. The RSC 12 also includes Output Segment Arbitration Logic 50. The Output Segment Arbitration Logic 50 as will be described in FIG. 6, is used to determine which virtual input queue should provide data to its output segment in an appropriate timeslot. One preferred scheme has the Output Segment Arbitration Logic 50 using a round robin time multiplexed arbitration algorithm.

The Input Segment Logic (ISL) 40 interfaces with the network processor 14 and determines which virtual queue an incoming mpkt (64 byte payload) should be sent to. The RSC 12 has a plurality of virtual queues. In one example, there are 16 virtual queues to which each input segment can direct incoming mpkts. The RSC 12 is arranged into segments e.g., 8 input segments. If fewer input segments are required (i.e., the RSC 12 is configured for fewer ports), then logically contiguous input segments are joined to form either a 32 bit datapath (32 ports), or a 16 bit datapath (64 ports).

The ISL 40 uses in-band information to control virtual queue loading and port arbitration. In-band information is used to minimize pin cost as would be associated with explicit out-of-band control. The in-band information includes a destination output port (8 bits), an SOP bit, a "Transmit As Is" control bit, a byte enable control bit, a CSR enable, and a Virtual Queue Identifier (4 bits). Since, there is only 8 bits of in-band data available per cycle, and there are 16 bits required, 2 in-band cycles are required. There is an optimization, in 64 or 32 port modes, 16 bits/32 bits of in-band information are possible, therefore only one in-band information cycle is required.

Input data to the crossbar includes two 32 bit header words containing control information followed by up to eight (8) 32 bit words of packet data. The 32 bit input word is connected to 4 input segments. The header is segmented into 2 bytes of control for each input segment, and specifies the VIQ to load, the output destination, byte count, end of packet, and byte enable for the last 32 bit word being transmitted. The 4 output segments specified receive the VIQ addresses of new packets being loaded in a "pending" output FIFO. All packets being sent to the same output port are loaded into a similar "pending" FIFO so that all four output byte segments begin to send data to the output FIFO bus on the same cycle. Byte data from the 4 output segments is combined to form the 32 bit output FIFO bus.

Two output segments per RSC are enabled to drive control signals (start of packet, end of packet, transmit as is, transmit error), while all segments drive byte enable signals. The output control logic samples the ready signals for all output destinations. All output segments update their ready bit status in lock step so that the 4 sliced bytes of the input FIFO bus can be switch at the same time.

The inputs to the input segment logic 42 include the FBUS data bits (7:0), and control signals, TxSel, EOP, and NewQHdr. The FBUS data bits are as above, the TxSel bits are used to frame the FBUS data bits as valid, whereas, EOP is used to explicitly identify the end of a packet. The NewQHdr bit indicates to the ISL 420 that a new set of Virtual Queue information is coming. An optimization may be that if EOP AND NewQhdr are asserted this would require only a single prepend cycle to indicate a target Virtual Queue. The implication in that case is that the transfer is not a new packet but rather continuation data from a currently transmitting packet. In this case an in-band EOP is required.

The Input Ready Logic (IRL) 46 samples the status of the 16 virtual queues in virtual queue logic 42*a*–42*p* associated with each input segment. If a VIQ has available space then the IRL will report that to a requesting network processor 14 (FIG. 1), via VIQ transmit ready bits. The network processor 14 can use this information to schedule transfers to the virtual queues.

The virtual queues VIQ's are associated with a particular output while there is valid data maintained in the virtual queue. The virtual queues can have a suitable storage depth e.g., 4 mpkts for 14 of the queues and to 8 mpkts for two, where each mpkt is 64 bytes. There are 16 Virtual queues associated with each input/output segment.

Other arrangements are possible. Each VIQ has an input pointer and an output pointer. The input pointer is used by the Input Segment Logic 40 (ISL) to push data into the VIQ, while the output pointer is used by the output Segment Logic to "pull" data from the VIQ for distribution out the transmit FBUS. In one implementation, the VIQ's are single ported random access memory devices. Since a read and write may be concurrently required for the full crossbar operation, the VIQ's are cycled twice as fast as the input fill rate. For example, if the input fill rate is 66–80 Mhz from the input segment FBUSES, the output drain rate would be a decoupled 66–80 Mhz FBUS drain rate then the VIQ's would operate at 133 to 166 Mhz that is twice as fast as the faster of the Input or Output FBUS rates. Alternatively, the queues can be organized as 2 bytes in width and accessed on alternate cycles.

In order to maximize the efficiency of the rotary switch 12, the switch fabric operates at twice the output FBUS drain rate. One way to accomplish this would be to cycle the VIQ's at twice the speed of the output FBUS drain rate. Another way would be to buffer the VIQ's to be twice as wide. Thus, if the VIQ's input segment is 8 bits wide, the VA's are buffered to form 16 bits of write data. Read operations will fetch 16 bits of read data which will be supplied to the switch fabric at 133–160 Mhz 8 bit chunks.

The Output Segment Logic (OSL) 44 is a timeslot filler. The Output Segment Logic 44 uses Output Segment Arbitration 50 results to select which new Virtual Queue should be "connected" to an output port. The OSL examines Transmit ready bits which are collected by the Output Ready bit Logic (ORL) 48 to determine if the output port is ready to accept a new mpkt (64 bytes). The Output Segment Logic decouples the VIQ crossbar logic from the output drain rate, by employing a 16 mpkt queue at each output segment (16*64B*8=8KB). This decoupling allows the crossbar to operate at a higher frequency. The OSL 44 includes a 16 entry timeslot queue. Each VIQ to Output Port has an explicit timeslot entry. If a VIQ is not available, its slot may be compressed. Up to n slots may be compressed (most likely n=2) before filling is "wait stated" until skipped VIQ's are available.

The Output Ready Logic (ORL) 48 interrogates the destination network devices 16 (FIG. 1) for transmit ready bits. The transmit ready bits are used by the RSC 12 in the Output Segment Logic 44 (OSL) to promote data from the RSC 12 to the appropriate output segment FBUS 31. The ORL 48 is a ready bus Master. It cycles through all attached MAC's fetching the transmit ready bits. The ORL 48 assembles all the transmit ready bits and provides them to their respective output segment. The OSL 48 uses these bits to determine if the tail of the queue should be filled with that output port's mpkt. This is done to avoid head of queue blocking.

The Output Segment Arbitration (OSA) 50 is used to link a virtual queue 42 (VIQ) to an output port. The RSC 12 employs a distributed crossbar selection scheme. The network processor 14 performs weighted fair queuing and provides the top elements for transmission to the RSC 12. The RSC 12 in turn uses a fair service algorithm and a non-blocking scheme so that efficiency is maintained.

Switch Arrangements

Figure 4A:
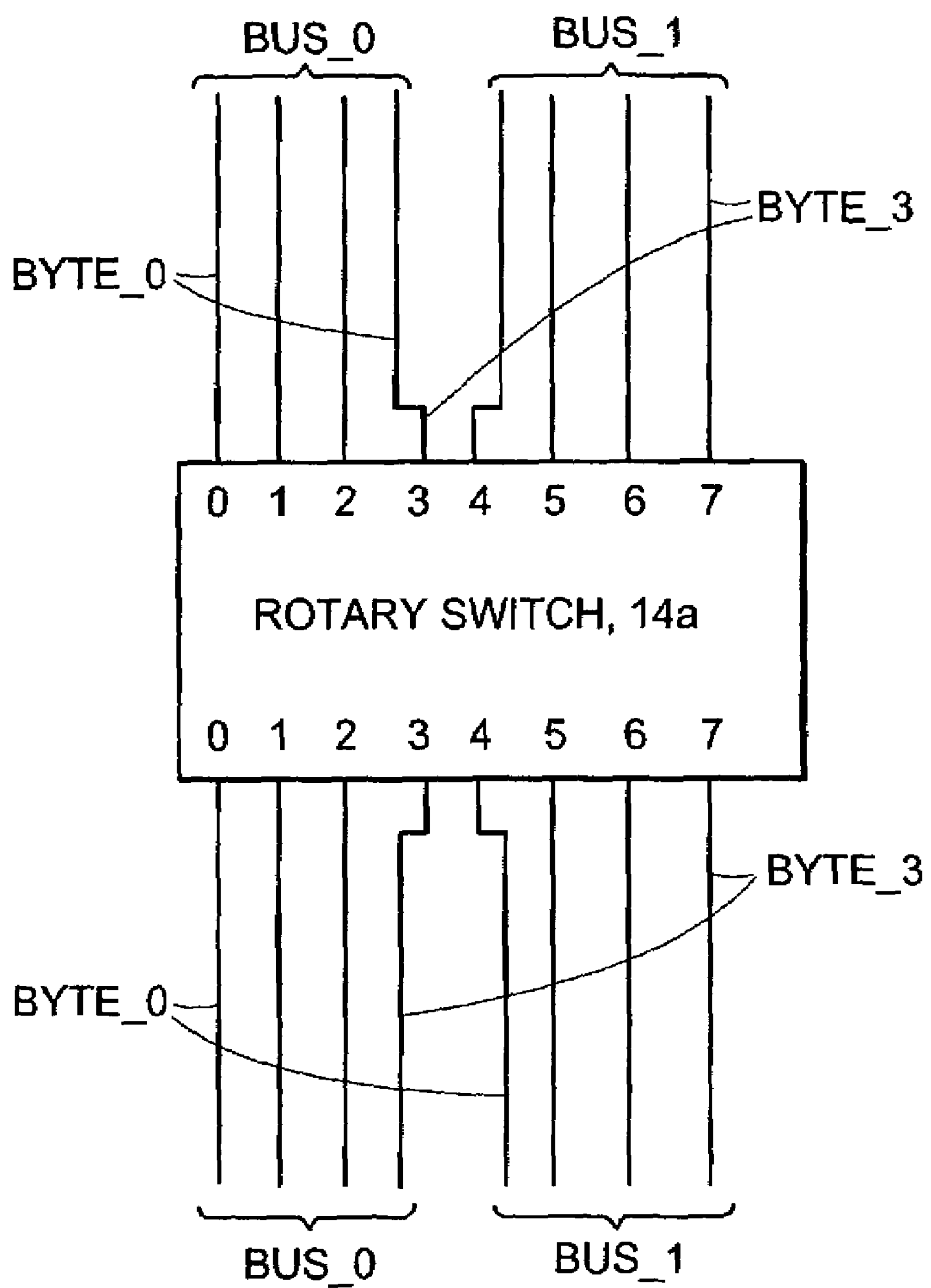
FIG. 4A is a block diagram of a rotary switch coupled in a byte sliced configuration.
Figure 5A:
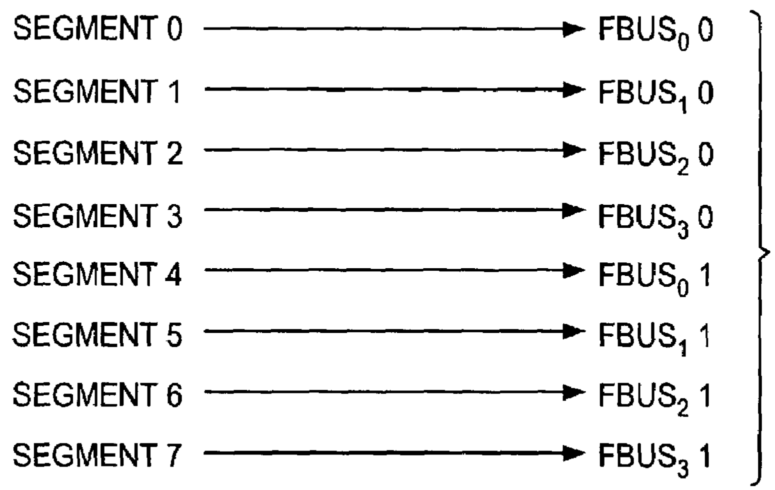
FIG. 5A is a chart diagram showing byte mapping for a single rotary switch of FIG. 4A.

Referring to FIG. 4A, a rotary switch 14*a*, is coupled to provide a 2×2 FIFO BUS switching fabric. The rotary switches 14*a* is fed by buses B0–B1 which are each 32-bit byte-sliced busses. The output of the rotary switch 14*a* is coupled to output busses e.g., FBUS_0 FBUS_1. On the input side, the four bytes of each bus B0–B1 are coupled in sequence to the rotary switch 14*a* and on the output side the first four output segments of each rotary switch provide the bytes of FBUS_0, the next four output segments provide the bytes of FBUS_1. The mapping for this arrangement is shown in FIG. 5A. In this manner a byte sliced architecture is provided. This byte sliced architecture; is non-blocking. That is, any input port can be connected to any output port without blocking any other input port from connecting to any other output port. In any one cycle, all input ports can couple data to different ones of all of the output ports.

Figure 4B:
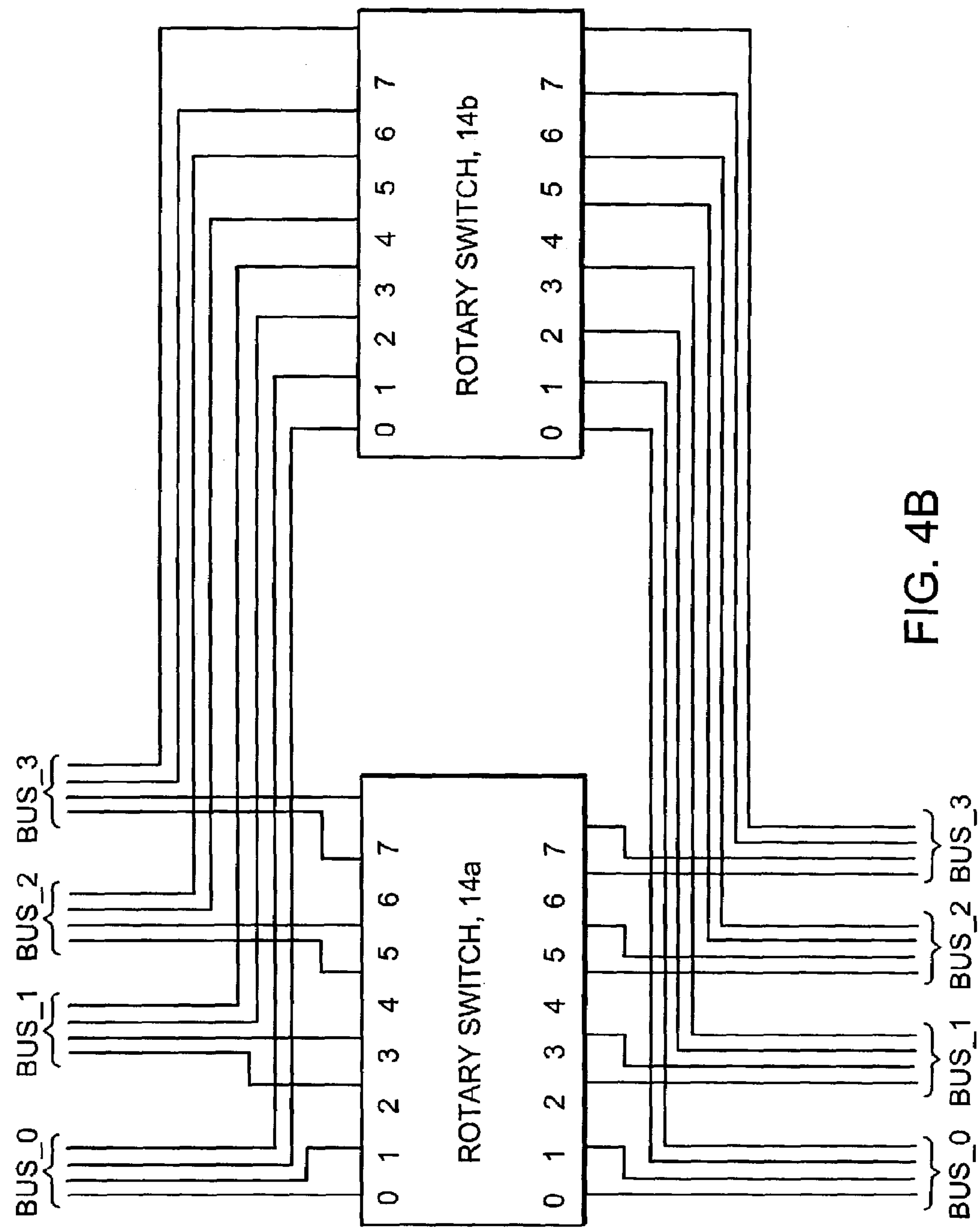
FIG. 4B is a block diagram of two rotary switches coupled in a byte sliced configuration.
Figure 5B:
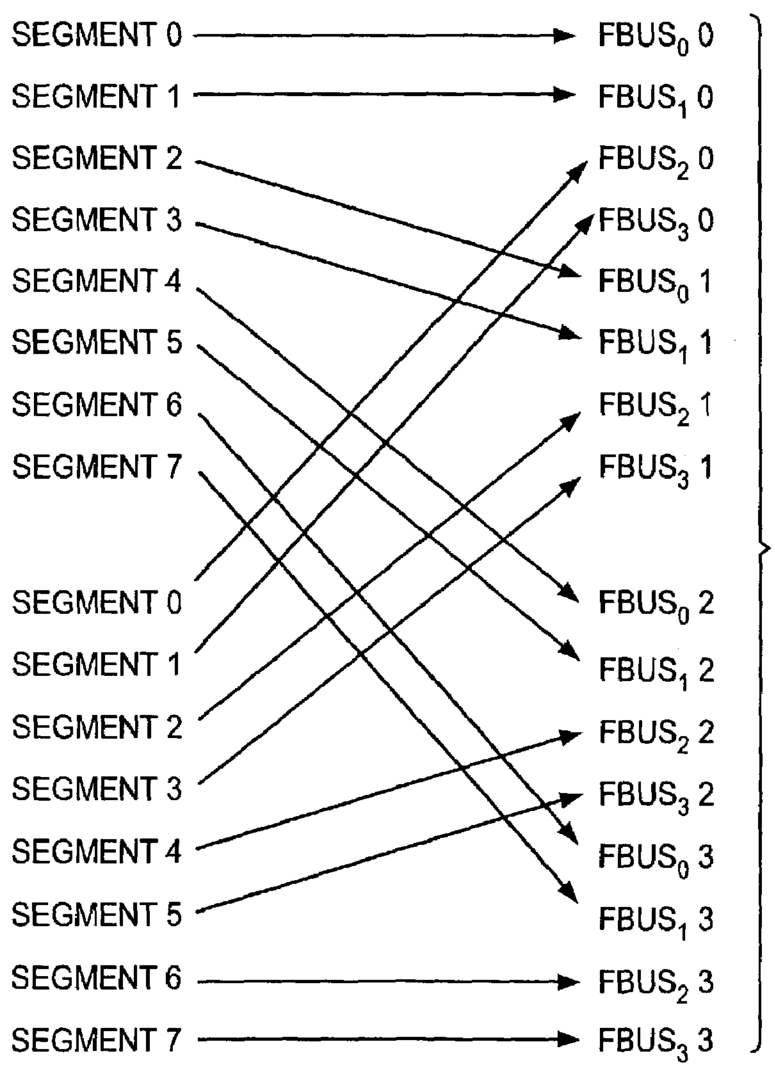
FIG. 5B is a chart diagram showing byte mapping in the device of FIG. 4B.

Referring to FIG. 4B, a pair of rotary switches 14*a*, 14*b* are coupled to provide a 4×4 FIFO BUS switching fabric. The rotary switches 14*a*, 14*b* have input segments coupled by buses B0–B3 which are each 32 bit byte sliced buses. The output segments of the rotary switches 14*a*, 14*b* are coupled to output busses e.g., FBUS_0 to FBUS_3. On the input side, the first two bytes of each bus B0–B3 are coupled to the input segments of the first rotary switch 14*a*, whereas, the last two bytes of each bus are coupled to the input segments of the second rotary switch 14*b*. On the output side the first two output segments of each rotary switch provide the bytes of FBUS_0, the next two output segments the bytes of FBUS_1 and so forth. The mapping for this arrangement is shown in FIG. 5B. In this manner a byte sliced architecture is provide. This byte sliced architecture, is a 4×4 architecture and is non-blocking. That is, any input port can be connected to any output port and not block any other input port from connecting to any other output port. In any one cycle, all input ports can couple data to different ones of all of the output ports.

Thus, rotary switches can be coupled to provide larger switching fabrics. Four switches (a mapping of which is set out below) can be coupled such that eight, 4 byte buses could be coupled to the four switches with first bytes of a each bus coupled to the first switch, second bytes of each bus coupled to the second switch, third bytes of each bus coupled to the third switch and fourth bytes of each bus coupled to the fourth switch. Moreover, with larger rotary switches i.e., that can interface to larger buses, e.g., 8 byte buses, even larger configurations could be provided in a similar manner. On the output side a similar connection arrangement is provided.

This switching fabric is scalable, i.e., easily expanded from a 2×2 FIFO bus configuration (32 ports to 32 ports) up to an 8×8 FIFO bus configuration (128 ports to 128 ports) without adding additional hierarchial levels of switches. That is, expansion occurs on a single level of switches which reduces latency and complexity.

Referring to FIG. 5A, the mapping as a 2×2 FIFO bus switching fabric requires one RSC 12, with bytes output mapped as follows:

1. output segment 0—byte 0 (bits(31:24)) output FIFO bus 0
2. output segment 1—byte 1 (bits(23:16)) output FIFO bus 0
3. output segment 2—byte 2 (bits(15:08)) output FIFO bus 0
4. output segment 3—byte 3 (bits(07:00)) output FIFO bus 0
5. output segment 4—byte 0 (bits(31:24)) output FIFO bus 1

6. output segment 5—byte 1 (bits(23:16)) output FIFO bus 1
7. output segment 6—byte 2 (bits(15:08)) output FIFO bus 1
8. output segment 7—byte 3 (bits(07:00)) output FIFO bus 1 and the input segments mapped as;

1. input segment 0—byte 0 (bits(31:24)) input FIFO bus 0
2. input segment 1—byte 1 (bits(23:16)) input FIFO bus 0
3. input segment 2—byte 2 (bits(15:08)) input FIFO bus 0
4. input segment 3—byte 3 (bits(07:00)) input FIFO bus 0
5. input segment 4—byte 0 (bits(31:24)) input FIFO bus 1
6. input segment 5—byte 1 (bits(23:16)) input FIFO bus 1
7. input segment 6—byte 2 (bits(15:08)) input FIFO bus 1
8. input segment 7—byte 3 (bits(07:00)) input FIFO bus 1 where $FBUS_xY$ corresponds to byte "x" of FBUS "Y." Thus, the output segments 0, 1, 2, 3 connect concurrently to corresponding Virtual Queues either in input segments 0, 1, 2, 3 or 4, 5, 6, 7, respectively.

Referring to FIG. 5B, to expand to a 4×4 FIFO bus switching fabric requires two RSC devices 14. FIG. 5B shows the output mapping with the output mapped as, 1. RSC_0 output segment 0—byte 0 (bits(31:24)) output FIFO bus 0
2. RSC_0 output segment 1—byte 1 (bits(23:16)) output FIFO bus 0
3. RSC_0 output segment 2—byte 0 (bits(31:24)) output FIFO bus 1
4. RSC_0 output segment 3—byte 1 (bits(23:16)) output FIFO bus 1
5. RSC_0 output segment 4—byte 0 (bits(31:24)) output FIFO bus 2
6. RSC_0 output segment 5—byte 1 (bits(23:16)) output FIFO bus 2
7. RSC_0 output segment 6—byte 0 (bits(31:24)) output FIFO bus 3
8. RSC_0 output segment 7—byte 1 (bits(23:16)) output FIFO bus 3
9. RSC_1 output segment 0—byte 2 (bits(15:08)) output FIFO bus 0
10. RSC_1 output segment 1—byte 3 (bits(07:00)) output FIFO bus 0
11. RSC_1 output segment 2—byte 2 (bits(15:08)) output FIFO bus 1
12. RSC_1 output segment 3—byte 3 (bits(07:00)) output FIFO bus 1
13. RSC_1 output segment 4—byte 2 (bits(15:08)) output FIFO bus 2
14. RSC_1 output segment 5—byte 3 (bits(07:00)) output FIFO bus 2
15. RSC_1 output segment 6—byte 2 (bits(15:08)) output FIFO bus 3
16. RSC_1 output segment 7—byte 3 (bits(07:00)) output FIFO bus 3

The input would be mapped in a similar manner (not shown in FIG. 5B). The input segments mapped as;

1. RSC_0 input segment 0—byte 0 (bits(31:24)) input FIFO bus 0

2. RSC_0 input segment 1—byte 1 (bits(23:16)) input FIFO bus 0
3. RSC_0 input segment 2—byte 0 (bits(31:24)) input FIFO bus 1
4. RSC_0 input segment 3—byte 1 (bits(23:16)) input FIFO bus 1
5. RSC_0 input segment 4—byte 0 (bits(31:24)) input FIFO bus 2
6. RSC_0 input segment 5—byte 1 (bits(23:16)) input FIFO bus 2
7. RSC_0 input segment 6—byte 0 (bits(31:24)) input FIFO bus 3
8. RSC_0 input segment 7—byte 1 (bits(23:16)) input FIFO bus 3
9. RSC_1 input segment 0—byte 2 (bits(15:08)) input FIFO bus 0
10. RSC_1 input segment 1—byte 3 (bits(07:00)) input FIFO bus 0
11. RSC_1 input segment 2—byte 2 (bits(15:08)) input FIFO bus 1
12. RSC_1 input segment 3—byte 3 (bits(07:00)) input FIFO bus 1
13. RSC_1 input segment 4—byte 2 (bits(15:08)) input FIFO bus 2
14. RSC_1 input segment 5—byte 3 (bits(07:00)) input FIFO bus 2
15. RSC_1 input segment 6—byte 2 (bits(15:08)) input FIFO bus 3
16. RSC_1 input segment 7—byte 3 (bits(07:00)) input FIFO bus 3 where in FIG. 5B, $FBUS_xY$ corresponds to byte "x" of FBUS "Y." Thus output segments (RSC_0 0,1/RSC_1 0,1), (RSC_0 2,3/RSC_1 2,3), (RSC_0 4,5/RSC_1 4,5), (RSC_0 6,7/RSC_1 6,7) representing output FIFO busses 0, 1, 2, and 3 respectively, connect concurrently to corresponding Virtual Input Queues in VIL 42 for the input segments of input FIFO busses 0, 1, 2, and 3.

Thus, an 8×8 FIFO bus crossbar requires 4 RSC chips, with the output mapped as:

1. RSC_0 output segment 0—byte 0 (bits(31:24)) output FIFO bus 0
2. RSC_0 output segment 1—byte 0 (bits(31:24)) output FIFO bus 1
3. RSC_0 output segment 2—byte 0 (bits(31:24)) output FIFO bus 2
4. RSC_0 output segment 3—byte 0 (bits(31:24)) output FIFO bus 3
5. RSC_0 output segment 4—byte 0 (bits(31:24)) output FIFO bus 4
6. RSC_0 output segment 5—byte 0 (bits(31:24)) output FIFO bus 5
7. RSC_0 output segment 6—byte 0 (bits(31:24)) output FIFO bus 6
8. RSC_0 output segment 7—byte 0 (bits(31:24)) output FIFO bus 7
9. RSC_1 output segment 0—byte 1 (bits(23:16)) output FIFO bus 0
10. RSC_1 output segment 1—byte 1 (bits(23:16)) output FIFO bus 1
11. RSC_1 output segment 2—byte 1 (bits(32:16)) output FIFO bus 2
12. RSC_1 output segment 3—byte 1 (bits(23:16)) output FIFO bus 3
13. RSC_1 output segment 4—byte 1 (bits(23:16)) output FIFO bus 4
14. RSC_1 output segment 5—byte 1 (bits(23:16)) output FIFO bus 5

15. RSC_1 output segment 6—byte 1 (bits(23:16)) output FIFO bus 6

16. RSC_1 output segment 7—byte 1 (bits(23:16)) output FIFO bus 7

17. RSC_2 output segment 0—byte 2 (bits(15:08)) output FIFO bus 0

18. RSC_2 output segment 1—byte 2 (bits(15:08)) output FIFO bus 1

18. RSC_2 output segment 2—byte 2 (bits(15:08)) output FIFO bus 2

19. RSC_2 output segment 3—byte 2 (bits(15:08)) output FIFO bus 3

20. RSC_2 output segment 4—byte 2 (bits(15:08)) output FIFO bus 4

21. RSC_2 output segment 5—byte 2 (bits(15:08)) output FIFO bus 5

22. RSC_2 output segment 6—byte 2 (bits(15:08)) output FIFO bus 6

23. RSC_2 output segment 7—byte 2 (bits(15:08)) output FIFO bus 7

24. RSC_3 output segment 0—byte 3 (bits(07:00)) output FIFO bus 0

25. RSC_3 output segment 1—byte 3 (bits(07:00)) output FIFO bus 1

26. RSC_3 output segment 2—byte 3 (bits(07:00)) output FIFO bus 2

27. RSC_3 output segment 3—byte 3 (bits(07:00)) output FIFO bus 3

28. RSC_3 output segment 4—byte 3 (bits(07:00)) output FIFO bus 4

29. RSC_3 output segment 5—byte 3 (bits(07:00)) output FIFO bus 5

30. RSC_3 output segment 6—byte 3 (bits(07:00)) output FIFO bus 6

31. RSC_3 output segment 7—byte 3 (bits(07:00)) output FIFO bus 7

The input segments would be mapped as follows:

1. RSC_0 input segment 0—byte 0 (bits(31:24)) input FIFO bus 0

2. RSC_0 input segment 1—byte 0 (bits(31:24)) input FIFO bus 1

3. RSC_0 input segment 2—byte 0 (bits(31:24)) input FIFO bus 2

4. RSC_0 input segment 3—byte 0 (bits(31:24)) input FIFO bus 3

5. RSC_0 input segment 4—byte 0 (bits(31:24)) input FIFO bus 4

6. RSC_0 input segment 5—byte 0 (bits(31:24)) input FIFO bus 5

7. RSC_0 input segment 6—byte 0 (bits(31:24)) input FIFO bus 6

8. RSC_0 input segment 7—byte 0 (bits(31:24)) input FIFO bus 7

9. RSC_1 input segment 0—byte 1 (bits(23:16)) input FIFO bus 0

10. RSC_1 input segment 1—byte 1 (bits(23:16)) input FIFO bus 1

11. RSC_1 input segment 2—byte 1 (bits(32:16)) input FIFO bus 2

12. RSC_1 input segment 3—byte 1 (bits(23:16)) input FIFO bus 3

13. RSC_1 input segment 4—byte 1 (bits(23:16)) input FIFO bus 4

14. RSC_1 input segment 5—byte 1 (bits(23:16)) input FIFO bus 5

15. RSC_1 input segment 6—byte 1 (bits(23:16)) input FIFO bus 6

16. RSC_1 input segment 7—byte 1 (bits(23:16)) input FIFO bus 7

17. RSC_2 input segment 0—byte 2 (bits(15:08)) input FIFO bus 0

18. RSC_2 input segment 1—byte 2 (bits(15:08)) input FIFO bus 1

18. RSC_2 input segment 2—byte 2 (bits(15:08)) input FIFO bus 2

19. RSC_2 input segment 3—byte 2 (bits(15:08)) input FIFO bus 3

20. RSC_2 input segment 4—byte 2 (bits(15:08)) input FIFO bus 4

21. RSC_2 input segment 5—byte 2 (bits(15:08)) input FIFO bus 5

22. RSC_2 input segment 6—byte 2 (bits(15:08)) input FIFO bus 6

23. RSC_2 input segment 7—byte 2 (bits(15:08)) input FIFO bus 7

24. RSC_3 input segment 0—byte 3 (bits(07:00)) input FIFO bus 0

25. RSC_3 input segment 1—byte 3 (bits(07:00)) input FIFO bus 1

26. RSC_3 input segment 2—byte 3 (bits(07:00)) input FIFO bus 2

27. RSC_3 input segment 3—byte 3 (bits(07:00)) input FIFO bus 3

28. RSC_3 input segment 4—byte 3 (bits(07:00)) input FIFO bus 4

29. RSC_3 input segment 5—byte 3 (bits(07:00)) input FIFO bus 5

30. RSC_3 input segment 6—byte 3 (bits(07:00)) input FIFO bus 6

31. RSC_3 input segment 7—byte 3 (bits(07:00)) input FIFO bus 7

For the 8×8 FIFO crossbar configuration each input/output segment of the RSC 12 switches 1 byte of the 32 bit FIFO bus concurrent with the other RSC 12 slices.

Referring to FIG. 6, distribution of the Output Segment Arbitration Logic (OSA) 50*a*–50*h* is shown. Each of the OSA logic elements 50 determine which virtual queue 42 to link to which of the output segment logic 44*a*–44*h*. The input FBUS segments at a start of a new packet provides a start of packet "SOP" flag, the destination port of this new packet and a virtual queue number. At this starting point the destination port is known, so a physical mapping to the output segment logic is performed. This mapping is stored in an output port Map Queue 60. Each physical port has an output port Map Queue $\mathbf{60}_0$–$\mathbf{60}_{127}$. These queues maintain pointers to the next virtual queue which has a packet for the port. Each Map Queue 60 maintains up to 8 entries (one for each input segment). The entry has the VIQ# of the next packet to be transmitted.

When the Output Segment Logic 44 completes the transmission of a packet to a particular port, the Output Segment Logic requests the Output Arbitration Logic 50 to supply the Output Segment Logic 44 with the NEXT_VQ number that is stored in that output ports' map queue 60 NEXT VQ. This NEXT_VQ number is an address that the Output Segment Logic 44 uses to control 8:1 multiplexers 62*a*–62*h* that feed the Output Segment Logic=s 44 16 mpkt entry output queues. The VIQ number is a 7 bit value. The three most significant bits indicate which Input Segment and the least significant 4 bits indicate which VIQ within that input segment. Using these 7 bits the OSL can completely specify the next packet to be transmitted.

Disposed between the Input Segment Logic (ISL) 40 and the output port Map Queue 60 is a time division multiplex bus 70 used by the eight input segments to transmit destination information to the selected output segments. This multiplexing is straightforward since there are at a maximum 8 new packets to be sorted and 16 cycles to promote their VIQ# to their respective Map Queue. Therefore, by employing a very simple round robin technique the input segment Destination ports are sorted over the next 8 cycles. The Map Queues drain using a first in first out algorithm.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A switch fabric comprises:

a network switch having a plurality of inputs and outputs, comprises:

a plurality of virtual queues;

input segment logic coupled to at least one bus, said input segment logic to determine to which virtual queue incoming data should be sent;

output segment logic to select which virtual queue should be connected to an output port; and a distributed switching arrangement to provide a non-blocking cross-bar switching fabric arrangement capability over a series of byte sliced buses, the distributed switching arrangement coupling the virtual queues to the output segment logic through the non-blocking cross-bar switching arrangement, the non-blocking cross-bar switching fabric arrangement capability comprising a plurality of multiplexers coupled to the outputs of the plurality of the virtual queues to select ones of the virtual queues to feed to a second plurality of multiplexers that produce inputs to the output segment logic.

2. The switching fabric of claim 1 wherein the switch is a first switch and the switching fabric further comprises:

a second network switch having a plurality of inputs and outputs.

3. The switching fabric of claim 2 wherein the distributed switching arrangement has the inputs of the first and second network switches coupled to a plurality of input buses so that a first byte of a first one of the buses is coupled to the first switch, and a last byte of the first bus is coupled to the second switch.

4. The switching fabric of claim 2 wherein the distributed switching arrangement has the outputs of the first and second network switches coupled to a plurality of output buses so that a first byte of a first one of the output buses is coupled to the first switch, and a last byte of the first output bus is coupled to the second switch.

* * * * *